United States Patent [19]

Neki et al.

[11] Patent Number: 4,473,020

[45] Date of Patent: Sep. 25, 1984

[54] SEWING MACHINE HAVING A SOFT-STARTING CIRCUIT

[75] Inventors: Shigeo Neki, Osaka; Nozomu Shinozaki; Takashi Dohi, both of Hirakata, all of Japan

[73] Assignee: Matsushita Electric Industrial Company, Limited, Japan

[21] Appl. No.: 386,783

[22] Filed: Jun. 7, 1982

[30] Foreign Application Priority Data

Jun. 11, 1981 [JP] Japan ................................. 56-89871

[51] Int. Cl.³ .......................................... D05B 69/18
[52] U.S. Cl. .................................. 112/277; 112/262.1; 318/318
[58] Field of Search ............... 112/277, 275, 220, 221, 112/121.11, 262.1; 318/315, 317, 318, 561, 313, 327, 341

[56] References Cited

U.S. PATENT DOCUMENTS

| 2,978,693 | 4/1961 | Champion . |
| 3,268,788 | 8/1966 | Branco . |
| 3,514,685 | 5/1970 | Burgess . |
| 3,543,116 | 11/1970 | Hanner . |
| 3,621,352 | 11/1971 | Dinger . |
| 3,731,301 | 5/1973 | Davis . |
| 4,040,508 | 8/1977 | Sunada et al. . |
| 4,052,646 | 10/1977 | Massey et al. . |
| 4,104,978 | 8/1978 | Takahashi . |
| 4,130,785 | 12/1978 | Penet . |
| 4,139,808 | 2/1979 | Matsumura . |
| 4,153,863 | 5/1979 | Schachte et al. . |
| 4,185,575 | 1/1980 | Brown et al. ....................... 112/277 |
| 4,227,137 | 10/1980 | Hartman . |
| 4,278,925 | 7/1981 | Minakuchi . |
| 4,298,832 | 11/1981 | Acker et al. . |
| 4,332,208 | 6/1982 | Watasue et al. ..................... 112/277 |
| 4,364,001 | 12/1982 | Heidt et al. ...................... 112/277 X |
| 4,386,301 | 5/1983 | Neki et al. . |

FOREIGN PATENT DOCUMENTS

| 650654 | 2/1963 | Belgium . |
| 28138 | 5/1981 | European Pat. Off. . |
| 2412895 | 3/1974 | Fed. Rep. of Germany . |
| 1453454 | 10/1965 | France . |
| WO80/00689 | of 0000 | PCT Int'l Appl. . |

*Primary Examiner*—Peter P. Nerbun
*Attorney, Agent, or Firm*—Lowe, King, Price & Becker

[57] ABSTRACT

A sewing machine comprises a pedal position detector for detecting the position of a manually operated foot pedal and generating therefrom a pedal position indicating signal. A predetermined position of the armshaft of the sewing machine is detected for generating an armshaft position signal. A soft-start speed setting circuit is provided for successively generating a soft-start speed setting signal of an increasing value as a function of time in response to the occurrence of the armshaft position signal. The soft-start speed setting signal is enabled when it is smaller in magnitude than the pedal position indicating signal and conversely the pedal position indicating signal is enabled when the latter is smaller than the soft-start speed setting signal. The enabled signal is used to control the speed of the sewing machine.

16 Claims, 3 Drawing Figures

SEWING MACHINE HAVING A SOFT-STARTING CIRCUIT

BACKGROUND OF THE INVENTION

The present invention relates to sewing machine speed control systems, and in particular to a digital sewing machine speed control system in which the machine speed is gradually increased during startup periods even if the speed control foot pedal is fully depressed for starting the machine.

Conventional sewing machine speed control systems include a circuit that generates a speed setting signal in response to the amount of depression of an operator-controlled foot pedal. The speed setting signal is typically generated by a magnetic sensor located with respect to a permanent magnet which is mounted for movement with the foot pedal, whereby the depression of the pedal results in a variation in the output of the magnetic sensor.

Copending U.S. patent application Ser. No. 199,704 filed Oct. 23, 1980 (now U.S. Pat. No. 4,386,301) by the same applicants as the present invention discloses a high precision sewing machine speed control system having a digital foot pedal position detector for generating a binary code in response to the amount of depression of the pedal and a read only memory for generating a speed control signal in response to the position indicating binary code.

It is of particular importance to the proper functioning of industrial sewing machines that the sewing machine speed be closely controlled in response to incremental changes in pedal depression. In particular, the rise time characteristic of an industrial sewing machine, which is defined by the time within which the desired speed is attained in response to a full depression of the pedal, is an important factor to the proper functioning of the machine. A typical value of the rise time is 100 milliseconds to attain a speed as high as 6000 rpm. However, because of such strict requirements there arises an inconvenience that the thread is cast off the needle during startup periods and the operator has to start again the machine.

SUMMARY OF THE INVENTION

It is therefore an object of the present invention to provide a sewing machine which is soft-started to prevent the thread from casting off the needle during startup periods even if the foot pedal of the machine is fully depressed at a rapid rate for starting the machine.

The sewing machine embodying the present invention comprises a pedal position detector for detecting the position of the manually operated foot pedal of the machine and generating therefrom a pedal position indicating signal. A predetermined position of the armshaft of the sewing machine is detected for generating an armshaft position signal. A soft-start speed setting circuit is provided for successively generating a soft-start speed indicating signal of an increasing value as a function of time in response to the occurrence of the armshaft position signal. The soft-start speed indicating signal is enabled when it is smaller in magnitude than the pedal position indicating signal and conversely the pedal position indicating signal is enabled when the latter is smaller than the soft-start speed indicating signal. The enabled signal is utilized to control the speed of the sewing machine. The soft-start speed setting thus acts as a variable upper limit imposed on the pedal position indicating signal during startup periods, so that even if the foot pedal is depressed rapidly to the maximum depth the needle will start reciprocating at speeds sufficiently low to keep the thread from casting off the needle and gains increasing speeds until it reaches the maximum speed.

BRIEF DESCRIPTION OF THE DRAWINGS

The present invention will be described in further detail with reference to the accompanying drawings, in which.

DETAILED DESCRIPTION

Figure 1:
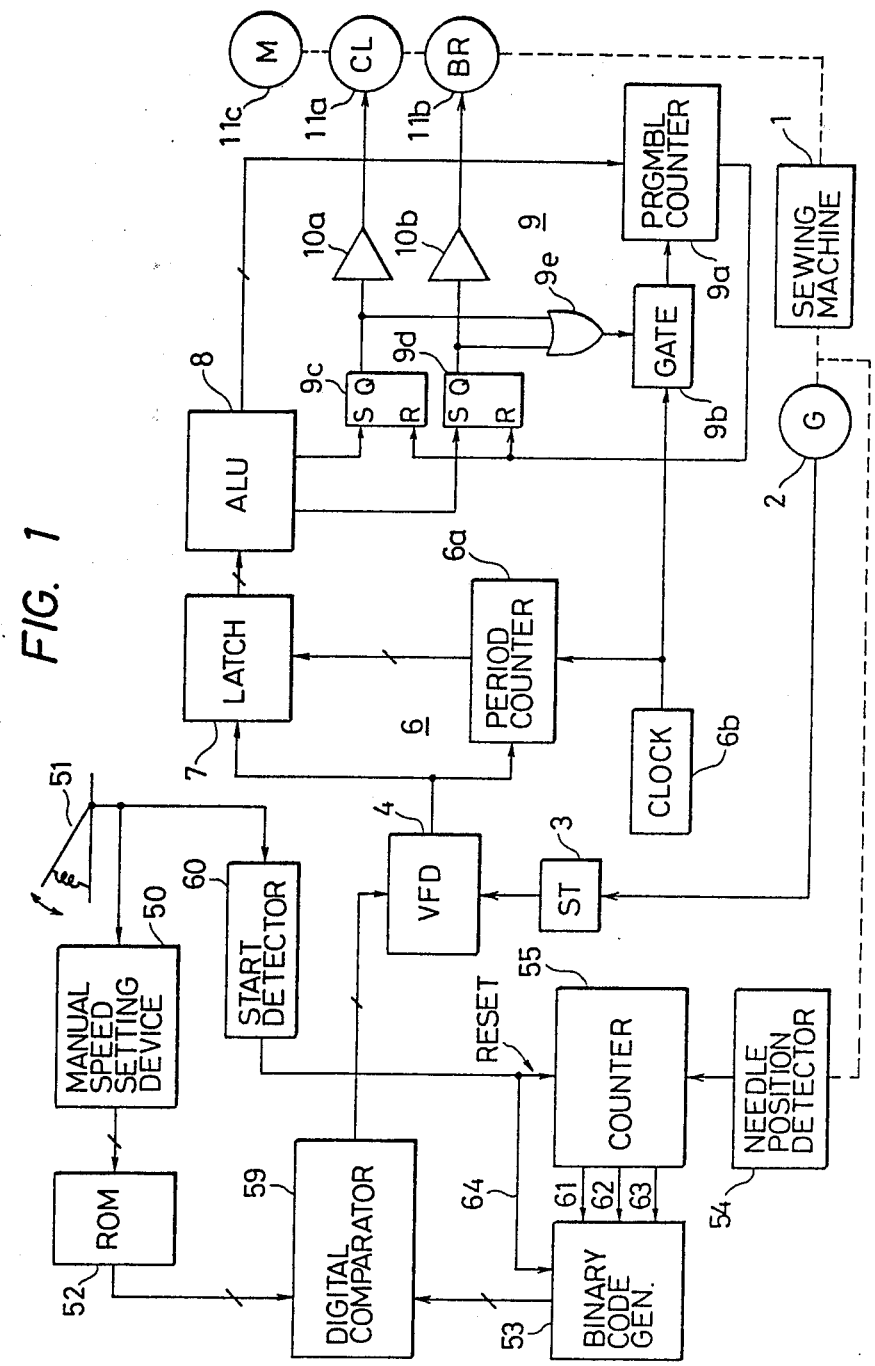
FIG. 1 is a block diagram of the speed control system according to the invention.

Referring now to FIG. 1, a sewing machine speed control system of the invention is schematically illustrated. The system includes a sewing machine speed setting circuit 5 which provides a digital speed setting signal as a function of the amount of operator's foot pedal depression and as a function of soft-start speed setting.

Before describing the detail of the speed setting circuit the speed control circuit of the sewing machine will be first described. A tachogenerator 2 of a conventional construction has its rotor operatively connected to the driven shaft of the sewing machine 1 which is driven by a motor 11c. This motor has a driving shaft which is coupled to the driven shaft of the sewing machine by a pulley-and-belt arrangement when a clutch actuating coil 11a is energized. The rotor shaft of motor M is decoupled from the sewing machine by a brake actuating coil 11b which subsequently applies a brake to the driven shaft of the sewing machine. Thus the speed of the sewing machine is controlled by the varying period of energization of clutch and brake operating coils 11a and 11b. Since the details of the motor construction is well known in the art, FIG. 1 only illustrates the associated parts in schematic form for the sake of simplicity. The tachogenerator 2 generates a train of 60 equally spaced apart impulses per revolution when the rotor turns at a speed of 200 rpm. The generated impulses are shaped into sharply defined, rectangular pulses by a wave shaping circuit 3, preferably a Schmitt trigger, and applied to a variable frequency divider 4. The frequency divider 4 comprises a programmable counter connected to the Schmitt trigger 3 for dividing the frequency of the pulses therefrom at a variable ratio of input to output frequency in response to the speed control binary code. The interval between successive pulses from the frequency divider 4 is measured by a counter means 6 comprising a binary counter 6a which is arranged to be enabled in respose to each pulse from the divider 4 for counting clock pulses from a clock source 6b and reset in response to a subsequent divider output pulse. The counted clock pulses are presented in the form of a 4-bit binary code to a latch 7 in response to the occurrence of each divider output pulse. The latched binary code will then be read in response to the next output of the frequency divider into an arithmetic unit 8. The arithmetic unit 8 may be a digital function generator comprising a memory. The data stored in the memory of unit 8 represents a predetermined transfer function describing the relationship between the interval measured by period counter 6a and a predicted pulse duration in which either one of coils 11a and 11b is to be subsequently energized. As will be described in detail hereinbelow, arithmetic unit 8 provides an acceleration or deceleration signal depending on whether the measured pulse interval is greater or smaller than a value determined by the transfer function and provides an output in the form of binary signals representing the predicted pulse duration to a pulse generator circuit 9.

More specifically, the transfer function of the arithmetic unit is described as $T = At - B$ where T represents the duration in which the coil 11a or 11b is to be subsequently energized and t represents the interval detected by the period detector 6, A and B are constants. Constant A is a factor that determines the gain of the closed loop of the speed control system, and B is appropriately determined in relation to a desired minimum speed of the sewing machine when the frequency division factor is unity.

The pulse generator 9 comprises a programmable counter 9a which presets its full count value to the binary signals from the arithmetic unit 8 and is clocked by source 6b through a gate 9b to increment its count to generate an output when the preset count is reached. The pulse generator circuit 9 further includes flip-flops 9c and 9d and an OR gate 9e. Flip-flops 9c and 9d respond respectively to acceleration and deceleration signals from arithmetic unit 8 to activate coils 11a and 11b through linear amplifiers 10a and 10b. The outputs of flip-flops 9c and 9d are coupled via OR gate 9e to the control terminal of gate 9b to pass clock pulses from source 6b to programmable counter 9a. Gate 9b is thus open in response to each of the acceleration and deceleration signal to cause programmable counter 9a to be incremented. On full count, the programmable counter 9a resets flip-flops 9c and 9d. Thus, flip-flops 9c and 9d each remain in a "1" state for a duration determined by the arithmetic unit 8, and clutch and brake coils 11a and 11b are correspondingly energized.

For purposes of explanation it is assumed that the tachogenerator 2 generates 60 impulses per revolution for a sewing machine speed of 200 rpm for an input to output frequency ratio of 1:1. The detected pulse interval t will then be 5 milliseconds which corresponds to the T-value of 2 milliseconds. This means that clutch coil 11a is energized with a duty cycle of 40% and the sewing machine is run at a constant speed.

If sewing machine speed decreases in response to an increase in sewing load, the measured pulse interval t will increase by an amount determined by the transfer function. An acceleration signal is generated from arithmetic unit 8 to trigger flip-flop 9c, so that clutch coil 11a is energized with a duty cycle greater than 40%. Since the sewing machine speed is proportional to an average value of successive energization times of coils 11a and 11b, an increase in the duty cycle results in acceleration of the sewing machine until it reaches 200 rpm. Conversely, a decrease in sewing machine load results in a decrease in duty cycle for clutch energization until the sewing machine speed decreases to 200 rpm. If the machine speed has further increased beyond 250 rpm so that the measured pulse interval is 4 milliseconds, a deceleration signal is generated to trigger the flip-flop 9d to energize brake coil 11b. As a result, the sewing machine speed rapidly decreases to 200 rpm.

If higher speed operation is desired the frequency dividing factor is increased to an appropriate value. For example, a dividing factor of 2 will result in the measured pulse interval t being doubled with a corresponding increase in clutch duty cycle and the sewing machine speed increases to 400 rpm. With the sewing machine speed so stabilized, the pulse interval t and hence the duty cycle assumes the same value as when the sewing machine was previously run at 200 rpm for a unity frequency division ratio, so that the measured interval t and duty cycle values are maintained constant once the system is stabilized to a new division ratio. The operating speed of sewing machine 1 can thus be varied at increments of an integral multiple of 200 rpm from the minimum speed of 200 rpm.

According to the present invention, the speed setting circuit 5 comprises a digital speed setting device 50 which is manually operated in response to the operator's foot pedal 51 to generate a binary signal representing the the amount of depression of the foot pedal from a reference or neutral position. The detail of the speed setting device 50 is shown and described in the aforesaid copending United States patent application. Briefly described, the speed setting device 50 generates a 4-bit binary signal, or BCD (binary coded decimal number) signal for each increment of a predetermined amount of pedal depression. A read only memory 52 is provided in which speed control data are stored. The speed control data is read out of the memory 52 in response to the binary signal of the variable speed setting device 50 and fed to an input of a digital comparator 59 to which is also applied a 4-bit binary signal from a soft-start speed setting circuit 53.

The speed setting circuit 5 further includes a needle-down position detector 54 which is operatively coupled to the armshaft of the sewing machine to detect its needle-down position for incrementing a counter 55. The counter 55 successively activates one of its output terminals when its count successively reaches a predetermined value to cause the binary code generator 53 to generate a corresponding 4-bit binary code for application to the comparator 52.

The digital comparator 52 compares the digital values of the outputs of the read only memory 52 and the soft-start speed setting circuit 53 and allows the output of memory 52 to pass to the variable frequency divider 4 if the amount of pedal depression is smaller than the speed set by the soft-start circuit 53, and if the amount of pedal depression is greater than the speed setting of circuit 53, the signal from the latter is allowed to pass to the variable frequency divider 4.

A start detector 60, coupled to the foot pedal 51, detects when the sewing machine is started when the foot pedal is depressed forward from its neutral position and applies its output to the counter 55 and soft-start d setting circuit 53. The output of the start detector 60 is at high level during standstill periods to reset the counter 55 and goes low when a starting condition is detected.

Figure 2:
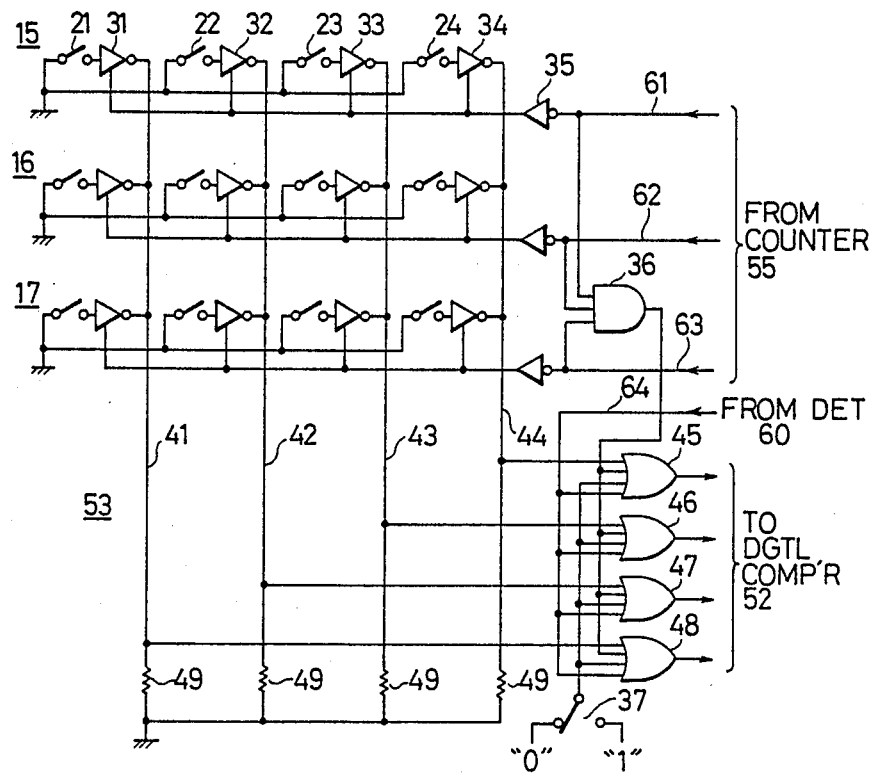
FIG. 2 is a circuit diagram of the detail of the soft-start binary code generator of FIG. 1.

FIG. 2 is an illustration of the detail of the soft-start speed setting circuit 53. As shown, the circuit 53 comprises rows 15, 16, 17 of switches 21 to 24 and corresponding buffer amplifiers 31 to 34 which are respectively connected to ground and arranged in a matrix. The buffer amplifiers in the rows 15 to 17 are respectively enabled by the output leads 61 to 63 of the counter 55 through input amplifiers 35. The outputs of the buffer amplifiers of corresponding columns of the matrix are multipled conductors 41 to 44 through resistors 49 to ground and to the first input terminals of OR gates 45 to 48 whose outputs are coupled to the digital comparator 52. The input signals on leads 61 to 63 from the counter 55 are also coupled to an AND gate 36 whose output is coupled to second input terminals of the OR gates 45 to 48. The third input terminals of the OR gates 45 to 48 are multipled to a manually operated transfer switch 37 which applies a "1" or "0" to the OR gates 45 to 48. The fourth input terminals of the OR gates 45 to 48 are also multipled to the lead 64 coupled from the start detector 60. The open and closed circuit conditions of the switches 21 to 24 in each row respectively indicate "0" and "1" states yielding 16 different combinations of binary states. It is preferable that the switches of each row of the matrix be constructed by a rotary encoder in accordance with the Gray code pattern.

The operation of the sewing machine of the invention will now be described. During standstill periods, the high level signal from the start detector 60 on lead 64 is coupled to OR gates 45, 46, 47, 48 of the circuit 53 so that a binary code "1 1 1 1" is applied to the digital comparator 59. Since this binary code is the highest value, the initial value of the output of read only memory 52 will be passed to the frequency divider 4. When the foot pedal 51 is depressed for starting the machine, the reset signal is removed from the counter 55 to allow it to receive needle position pulses from the needle position detector 54 and at the same time the binary code generated at the outputs of OR gates 45 to 48 now changes to "0 0 0 0" which resets the dividing factor to unity to operate the sewing machine at a minimum speed SP1 (see FIG. 3).

Figure 3:
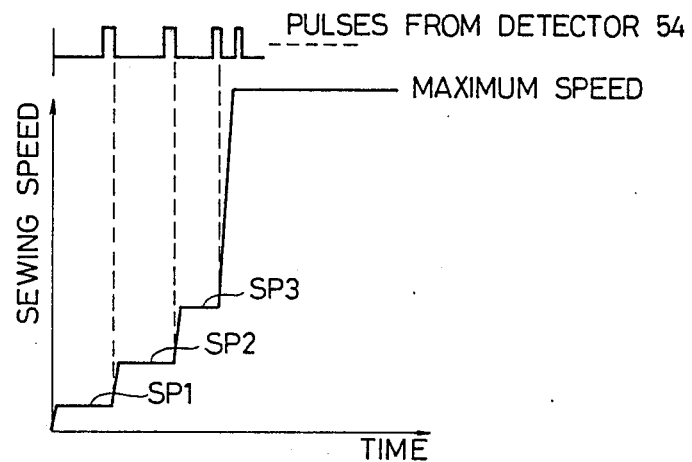
FIG. 3 is a graphic illustration of the soft-starting characteristic of the sewing machine.

As the sewing machine gains speed and the needle-down position detector 54 starts generating pulses. The counter 55 delivers a low-level output to lead 61 when a first predetermined full count is reached. This enables the switch group 15 to apply its binary condition to OR gates 45 to 48 and thence to the comparator 52. This binary signal, if smaller than the signal from the speed setting device 50, will be passed to the frequency divider 4 so that the sewing machine speed is raised to a value SP2 as shown in FIG. 3.

The counter 55 is incremented by subsequent needle position pulses to place low level signals to leads 62 and 63 in succession to enable the switch groups 16 and 17 to pass their binary codes to OR gates 45 to 48. If these binary codes are still smaller than the signal read out of the read only memory 52, the dividing factor of the frequency divider 4 will be reset to these settings to increase the sewing machine speed in succession to SP3 and then to the maximum speed value in soft-start fashion. As a result, the needle thread is prevented from being cast off the needle hole, which might otherwise occur due to rapid depression of the foot pedal. The rate at which the sewing speed increases may be changed as desired by appropriately resetting the open-and-closed conditions of the switches 21 to 24.

At the end of the soft-starting operation, the outputs of the counter 55 all change to a high voltage level activating the AND gate 36 to place a binary code "1 1 1 1" to OR gates 45 to 48 in order to allow the signal from the read only memory 52 to be passed to the frequency divider 4 for variable high speed operations.

On the other hand, if the amount of pedal depression is smaller than the speed settings of the binary soft-start circuit 53, the speed setting of the read only memory 52 will be enabled and the setting of the soft-start circuit is disabled. In this instance, the sewing speed is manually controlled by pedal operation. Such manual soft-start operation is also available by disabling the soft-start function. This is accomplished by operating the switch 37 to apply a high level voltage to all the OR gates 45 to 48.

Various modifications are apparent to those skilled in the art without departing from the scope of the invention which is only limited by the appended claims. For example, the speed control circuit including elements 4, 6, 7, 8 and 9 and the binary code generator 53, counter 55, digital comparator 59 and read only memory 52 could be readily realized economically by a microcomputer.

What is claimed is:

1. A sewing machine having a motor for transmitting its motive power to the armshaft of the sewing machine in accordance with the position of a manually operated pedal, comprising in a closed loop:
   position detecting means for detecting the position of said manually operated pedal and generating therefrom a pedal position indicating signal;
   means for detecting a predetermined position of the armshaft of said sewing machine and generating therefrom an armshaft position signal;
   soft-start speed setting means for successively generating a speed setting signal of an increasing value as a function of time in response to the occurrence of said armshaft position signal;
   means for enabling said speed setting signal when same is smaller in magnitude than said pedal position indicating signal and enabling said pedal position indicating signal when same is smaller than said speed setting signal; and
   means for controlling the speed of said sewing machine in accordance with said enabled signal.

2. A sewing machine as claimed in claim 1, wherein said soft-start speed setting means comprises counter means for counting said armshaft position indicating signal to successively generate said speed setting signals in response to the counted signal successively reaching predetermined values.

3. A sewing machine as claimed in claim 2, further comprising means for detecting when the sewing machine starts operating and resetting said counter means.

4. A sewing machine as claimed in claim 1 or 2, further comprising a manually operated switch means for selectively enabling said said soft-start speed setting means to cause said speed controlling means to respond to said enabled signal and disabling said soft-start speed setting means to cause said speed controlling means to respond exclusively to said position indicating signal.

5. A sewing machine as claimed in claim 1, wherein said means for detecting the predetermined position of said armshaft comprises means for detecting a needle position of said sewing machine.

6. A sewing machine as claimed in claim 1, further comprising a digital memory storing a set of digital speed control signals, the memory being responsive to said pedal position indicating signal to generate a digital speed control signal for application to said speed control means.

7. A sewing machine as claimed in claim 1, wherein said speed controlling means comprises tachogenerator means for generating pulses at a frequency proportional to the speed of said sewing machine, variable frequency dividing means for dividing the frequency of the pulses generated by said tachogenerator means at a variable ratio of input to output frequency in response to said enabled signal, counter means connected for measuring the interval between successive pulses from the output of said frequency dividing means, and means coupled to said counter means for translating said measured interval according to a predetermined transfer function describing the relationship between said measured interval and a duration in which said sewing machine is to be subsequently accelerated or decelerated and generating a corresponding output signal, and means for controlling the motive power of said motor transmitted to said sewing machine in response to said output signal.

8. A sewing machine as claimed in claim 7, wherein said translating means comprises means for generating a first output signal in accordance with said transfer function when said measured interval is greater than a predetermined value and a second output signal when said measured interval is smaller than said predetermined value, means for converting said first and second output signals into first and second speed control pulses of said duration respectively, solenoid clutch means responsive to said first speed control pulse for transmitting the motive power of said motor to the sewing machine, and solenoid brake means responsive to said second control pulse for applying braking to said sewing machine.

9. A sewing machine as claimed in claim 2, wherein said soft-start speed setting means comprises a plurality of manually operated switches arranged in a matrix of rows and columns, the switches arranged in each row being responsive to an output signal from said counter means to provide a combination of binary states, the switches arranged in each column being coupled together to generate a binary code as said speed setting signal.

10. A method for operating a sewing machine having a motor for transmitting its motive power to the armshaft of the sewing machine in accordance with the position of a manually operated pedal, comprising the steps of:
   detecting the position of said manually operated pedal and generating therefrom a pedal position indicating signal;
   detecting a predetermined position of the armshaft of said sewing machine and generating therefrom an armshaft position signal;
   successively generating a speed setting signal of an increasing value as a function of time in response to the occurrence of said armshaft position signal;
   enabling said speed setting signal when same is smaller in magnitude than said pedal position indicating signal and enabling said pedal position indicating signal when same is smaller than said speed setting signal; and
   controlling the speed of said sewing machine in accordance with said enabled signal.

11. A method as claimed in claim 10, further comprising counting said armshaft position indicating signal to successively generate a counter output in response to the counted signal successively reaching a predetermined value for generating said speed setting signal.

12. A method as claimed in claim 10, wherein the step of enabling comprises comparing said pedal position indicating signal with said speed setting signal for enabling said pedal position indicating signal when same is smaller than said speed setting signal and enabling said speed setting signal when same is smaller than said pedal position indicating signal and utilizing the enabled signal for controlling the speed of the sewing machine.

13. A method as claimed in claim 10, wherein the step of detecting the predetermined position of said armshaft comprises detecting a needle position of said sewing machine.

14. A method as claimed in claim 10, further comprising storing a set of digital speed control signals in a memory and reading the stored digital speed control signal in response to said pedal position signal for controlling the amount of motive power of said motor transmitted to said sewing machine.

15. A method as claimed in claim 10, wherein the step of controlling the speed of said sewing machine comprises generating pulses at a frequency proportional to the speed of said sewing machine, dividing the frequency of the pulses at a variable ratio in response to said pedal position indicating signal, measuring the interval between successive ones of said frequency divided pulses, and translating said measured interval according to a predetermined transfer function describing the relationship between said measured interval and a duration in which said sewing machine is to be subsequently accelerated or decelerated and generating a corresponding output signal, and controlling the motive power of said motor transmitted to said sewing machine in response to said output signal.

16. A method as claimed in claim 15, wherein the step of translating comprises generating a first output signal in accordance with said transfer function when said measured interval is greater than a predetermined value and a second output signal when said measured interval is smaller than said predetermined value, converting said first and second output signals into first and second speed control pulses of said duration respectively, transmitting the motive power of said motor to the sewing machine in the presence of said first output signal and applying braking to said sewing machine in the presence of said second output signal.

* * * * *